United States Patent [19]

Koshida et al.

[11] Patent Number: 5,122,160
[45] Date of Patent: Jun. 16, 1992

[54] BENZOQUINONE DYE, ROPE-DYEING DYE COMPOSITIONS, COTTON ROPE-DYEING METHODS USING SAME, AND THE THUS DYED MATERIALS

[75] Inventors: Hitoshi Koshida; Tetsuo Sakagawa, both of Nishinomiya; Takayuki Nakayama, Amagasaki; Hiroshi Suwa, Kobe; Akitoshi Igata, Ohmuta; Masao Imai, Yokohama, all of Japan

[73] Assignee: Mitsui Toatsu Chemicals, Incorporated, Tokyo, Japan

[21] Appl. No.: 620,549

[22] Filed: Dec. 4, 1990

[30] Foreign Application Priority Data

Dec. 6, 1989 [JP] Japan ................... 1-315142

[51] Int. Cl.⁵ ............... C09B 3/58; C09B 7/00
[52] U.S. Cl. ............................. 8/638; 8/653; 8/650; 8/918
[58] Field of Search .............. 8/638, 653, 650, 918

[56] References Cited

U.S. PATENT DOCUMENTS 4,941,887 7/1990 Sakagawa et al. ............. 8/638

FOREIGN PATENT DOCUMENTS 276171 7/1988 European Pat. Off.
343925 11/1989 European Pat. Off.
233813 5/1925 United Kingdom.

OTHER PUBLICATIONS

Patent Abstracts of Japan, vol. 14, No. 20, Jan. 17, 1990, JP-A-1261462.
Patent Abstracts of vol. 14, No. 80, Feb. 15, 1990, JP-A-1297470.
Zollinger, *Color Chemistry*, page 153, 1987.
*Colour Index*, third Edition, vol. 4, 1973.

*Primary Examiner*—Paul Lieberman
*Assistant Examiner*—Bardley A. Swope
*Attorney, Agent, or Firm*—Millen, White and Zelano

[57] ABSTRACT

Denim cotton warp yarns are rope-dyed with a benzoquinone dye of formula (I):

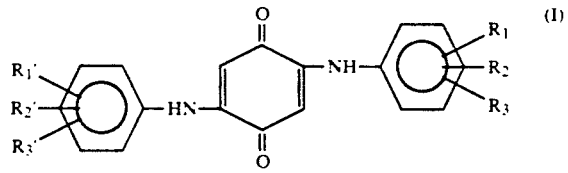

wherein $R_1$, $R_2$, $R_3$, $R_1'$, $R_2'$ and $R_3'$ commonly or independently represent a hydrogen atom, a halogen atom, alkyl, cycloalkyl, alkenyl, aryl, aralkyl, alkoxyl or alkoxyalkyl alone or in combination with a red $\Delta^{2,3'}$-biindolin-3,2'-dione dye and/or a blue indigoid dye or sequentially with the latter dye.

18 Claims, No Drawings

BENZOQUINONE DYE, ROPE-DYEING DYE COMPOSITIONS, COTTON ROPE-DYEING METHODS USING SAME, AND THE THUS DYED MATERIALS

BACKGROUND OF THE INVENTION a) Field of the Invention

The present invention relates to a process for the dyeing of denim cotton yarns and to dyeing compositions useful therein. More specifically, this invention is concerned with dyes and dye compositions for dyeing cotton yarns such as denim cotton warp yarns, with cotton yarn dyeing processes using one or more of these dyes and dye compositions, and with the thus dyed cotton yarns.

b) Description of the Related Art

Denim is popular for its cotton feeling and high durability as apparel fabrics and is widely used in work clothes, women's trousers, children's clothing and the like.

Blue dyed jeans made of cotton denim, called "blue jeans", have been worn extensively for many years. This wide-spread acceptance of blue jeans can be attributed to the fact that the characteristic hue of the fabric dyed with a blue indigoid dye and its time-dependent hue variations have wide appeal and that the development of clothes making use of such time-dependent hue variations and placing an emphasis on the resultant visual effect is feasible.

Reflecting ever-increasing diversification and individuality in the choice of clothing, there is however an increasing demand for jeans of a color other than that of blue jeans, such as yellow, red or black, namely, so-called "colored jeans". The requirement accordingly is to color denim as fabric for jeans, in various color tones ranging from gray to black.

To dye cotton warp yarns for color denim pursuant to the popularization of colored jeans, a sulfide dye, vat dye, reactive dye or naphthol dye is conventionally used.

However, colored jeans produced from yarn dyed using these dyes differ in various properties from those produced from yarn dyed with blue indigoid dyes. Their value as merchandise, ranging from dyed fabrics to clothes, hence differ from the values of the conventional blue jeans.

As mentioned above, blue jeans are preferred as clothing for their characteristic hue and various other properties. Such characteristic features are equally desired for colored jeans. However, such characteristic features cannot be obtained from materials dyed with a sulfide dye, vat dye, reactive dye or naphthol dye.

Further, the dyeing behavior of such a sulfide, vat, reactive or naphthol dye is far different from that of the blue indigoid dyes widely used to date. Therefore, conventional rope-dyeing facilities for blue jeans, which were designed for use with blue indigoid dyes, are unsuited for dyeing cotton warp yarns with a sulfide, vat, reactive or naphthol dye.

Moreover, the bleaching effect by chlorine bleach can hardly be expected for these dyes. Accordingly, when bleach is applied to a black denim containing cotton warp yarns dyed black with a mixture of a blue indigoid dye and conventional yellow and red threne dyes, only the blue is bleached, leaving an orange color. The commercial value of yarns thus dyed and fabric woven therefrom is therefore considerably impaired.

Unlike the indigoid dyes, because the bleaching effect by chlorine can be brought about only to a minimum extent for sulfide dyes, vat dyes, reactive dyes and naphthol dyes, such a fading effect as that observed on blue jeans cannot be expected for materials rope-dyed with a dye composition of a mixture of a blue indigoid dye and another dye such as a sulfide dye, vat dye, reactive dye or naphthol dye. The rope-dyed materials therefore look very inferior from the standpoint of commercial value.

As described above, there has not yet been found any dye which exhibits dyeing behavior similar to blue indigoid dyes and which has similar properties thereto. The corollary to this is that there has been neither a dyeing process for cotton yarns in which a non-indigoid dye having such properties is used nor have colored jeans been produced using cotton denim dyed with such a dye.

SUMMARY OF THE INVENTION

A first object of the present invention is to provide a dye which exhibits dyeing behavior and also undergoes bleach decoloring in a manner similar to the blue indigoid dyes, and also to provide a dye composition with such a dye mixed therein.

A second object of the present invention is to provide a rope-dyeing process for denim cotton warp yarns, in which the above dye or dye composition is used.

A third object of the present invention is to provide a dyed material, such as cotton warp yarns for color denims, dyed in a color tone ranging from gray to black.

Other objects will be apparent to those skilled in the art.

As a result of an extensive investigation, the present inventors have attained the above objects by using, as a dyestuff, at least one benzoquinone dye [either alone or] in combination with at least one $\Delta^{2,3'}$-biindolin-3,2'-dione dye (hereinafter abbreviated indirubin dye).

The following rope-dyeing dye compositions are provided in accordance with the present invention:

a) A rope dyeing yellow dye composition comprising a benzoquinone dye represented by formula (I):

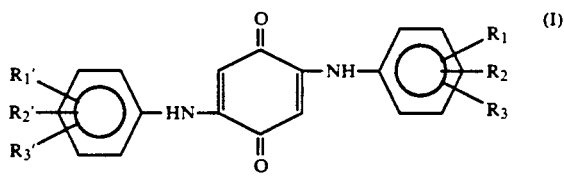

wherein $R_1$, $R_2$, $R_3$, $R_1'$, $R_2'$ and $R_3'$ commonly or independently represent a hydrogen atom, a halogen atom, a linear or branched alkyl group, a cycloalkyl group, an alkenyl group, a substituted o unsubstituted aryl group, an aralkyl group, an alkoxyl group or an alkoxyalkyl group.

b) A rope-dyeing dye composition comprising at least one yellow benzoquinone dye represented by formula (I) and at least one red indirubin dye represented by formula (II)

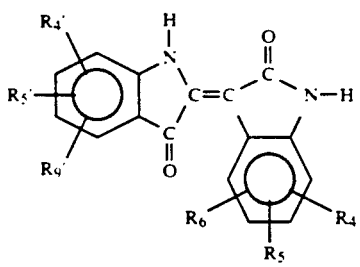

(II)

wherein $R_4$, $R_5$, $R_6$, $R_4'$, $R_5'$ and $R_6'$ each commonly or independently represent a hydrogen atom or a halogen atom.

c) A rope-dyeing dye composition comprising at least one yellow benzoquinone dye represented by formula (I) and at least one blue indigoid dye represented by the formula (III):

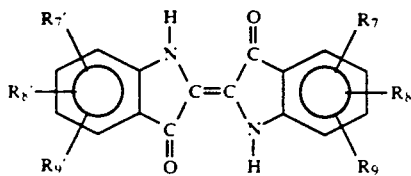

(III)

wherein $R_7$, $R_8$, $R_9$, $R_7'$, $R_8'$ and $R_9'$ each commonly or independently represent a hydrogen atom or a halogen atom.

d) A rope-dyeing dye composition comprising at least one yellow benzoquinone dye represented by formula (I), at least one red indirubin dye represented by formula (II) and at least one blue indigoid dye represented by formula (III).

The present invention also provides the following rope-dyeing process:

a) A rope-dyeing process comprising the following consecutive steps: immersing cotton warp yarns, which are to be rope-dyed, in a dye bath containing the reduced form of a dye composition a), b), c) or d), squeezing the thus-immersed cotton warp yarns, and oxidizing the thus-squeezed cotton warp yarns with air, and then repeating the immersing, squeezing and oxidizing substeps until the cotton warp yarns are dyed to the desired shade; and b) A rope-dyeing process comprising the following consecutive steps: immersing cotton warp yarns, which are to be rope-dyed, in a dye bath containing the reduced form of at least one blue indigoid dye represented by formula (III), squeezing the thus-immersed cotton warp yarns, and oxidizing the thus-squeezed cotton warp yarns with air; repeating the immersing, squeezing and oxidizing substeps until the cotton warp yarns are dyed to the desired shade of blue; immersing the thus dyed cotton warp yarns in a dye bath containing the reduced form of the rope-dyeing dye composition b), squeezing the thus-immersed cotton warp yarns, and oxidizing the thus-squeezed cotton warp yarns with air, and then repeating the immersing, squeezing and oxidizing substeps to dye the cotton warp yarns to the desired shade.

In addition, the present invention also provides denim cotton warp yarns dyed by any one of the above dyeing processes.

Application of the present invention upon continuous rope dyeing of denim cotton warp yarns makes it possible to impart a yellow, orange or green color or, based on suitable proportioning of the above-described three types of dyes, other colors led by gray and ranging up to black. Materials so dyed have good light fastness and can be decolored by chlorine bleach. Their time-dependent variations in color tone are substantially no different from those of materials dyed with blue indigoid dyes. Cotton yarns so dyed can be twilled as warp yarns with undyed yarns or dyed yarns to manufacture colored denim. Use of such colored denim makes it possible to meet the market demand for colored jeans.

DESCRIPTION OF THE PREFERRED EMBODIMENTS

Benzoquinone dyes of formula (I) are obtained, for example, by condensation reaction of a hydroquinone and an aniline compound having corresponding substituents. Indirubin dyes of formula (II) are also obtained, for example, by oxidizing a compound which is obtained after condensation reaction of a sodium indoxyl and an isatin.

Benzoquinone dyes of formula (I) are known in the art as yellow dyestuffs used for dyeing wool or cotton. See "Color Index Third Edition Vol. 4 P4505", whose disclosure is incorporated herein by reference.

Benzoquinone dyes and indirubin dyes generally have inferior dyeing ability for cotton when employed as dyestuffs in a dyeing process designed for cellulose fibers. However, by repeating dyeing steps of denim cotton warp yarns as described above, denim cotton warp yarns can be progressively dyed to darker yellow or red colors. Further, use of such yellow and/or red dyes in combination with a blue indigoid dye permits dyeing in colors ranging from gray to black.

The present inventors have found that these benzoquinone dyes and indirubin dyes exhibit dyeing behavior similar to blue indigoid dyes, rope-dyeing denim cotton warp yarns with them is feasible by repeating immersion, squeezing and air oxidation, and the thus dyed yarns and materials woven therefrom have good light fastness and show similar decoloration by chlorine bleach and similar tendency to time-dependent variations in shade to those dyed with the blue indigoid dyes. The present inventors have also found that, owing to the similarity in dyeing behavior between these benzoquinone dyes and indirubin dyes and blue indigoid dyes, their combined use with such blue indigoid dyes makes it possible to impart mixed colors led by black and hence to meet the demand for colored jeans. These findings have led to the completion of the present invention.

Dyeing of cotton yarns with a benzoquinone dye of formula (I) alone or with a dye composition containing the benzoquinone dye of formula (I) and an indirubin dye of formula (II), or containing a benzoquinone dye of formula (I) and the indigoid dye of formula (III), or containing a benzoquinone dye of formula (I), an indirubin dye of formula (II) and an indigoid dye of formula (III) is conducted by a rope-dyeing process as will be described next.

In a continuous rope-dyeing process by way of example, a number of single yarns are aligned into a single rope-like configuration, i.e., a tow and is then wound into a ball-like configuration. From these wound warp yarns, plural yarns are paid out at the same time and are then guided to several sets of dye baths equipped with squeezing rolls and an airing means. Brief dyeing and oxidizing steps are repeated so that the yarns are gradually dyed a darker shade.

As an alternative process, denim cotton warp yarns in the form of ropes are immersed in a dye bath containing the three kinds of dyes, i.e., a benzoquinone dye of formula (I), an indirubin dye of formula (II) and an indigoid dye of formula (III), followed by squeezing and air oxidation. These steps are repeated to dye the denim cotton warp yarns to the desired shade. By this process, colored jeans ranging from gray to black can be obtained.

In the yellow benzoquinone dyes employed in the process of the present invention are represented by the formula (I), specific examples of $R_1$, $R_2$, $R_3$, $R_1'$, $R_2'$ and $R_3'$, either commonly or independently, include a hydrogen atom; halogen atoms, such as fluorine, chlorine and bromine atoms; alkyl groups, preferably of 1 to 8 carbon atoms, which may be either linear or branched, such as methyl ethyl, propyl, isopropyl and butyl groups; cycloalkyl groups, preferably of 3 to 8 ring carbon atoms, such as cyclopentyl, cyclohexyl and cyclooctyl; alkenyl groups, preferably of up to 8 carbon atoms, such as allyl, crotyl (i.e., 2-butenyl), 3-butenyl and 2-pentenyl groups; aryl groups, preferably carbocyclic with 1-3 separate or fused rings, such as a phenyl group and substituted phenyl groups such as p-methylphenyl, m-methylphenyl, p-methoxyphenyl and p-ethoxyphenyl; aralkyl groups, preferably wherein aryl and alkyl are as defined above, such as benzyl, phenethyl and 3-phenylpropyl groups; alkoxyl groups, preferably of 1 to 8 carbon atoms, such as methoxyl, ethoxyl and isopropoxyl groups; and alkoxyalkyl groups, preferably wherein alkoxy and alkyl are as defined above, such as methoxymethyl, methoxyethyl, ethoxyethyl and propoxyethyl groups.

Examples of such dyes are those wherein one of $R_1$, $R_2$ and $R_3$ and one of $R_1'$, $R_2'$ and $R_3'$ both are hydrogen atoms, chlorine atoms or bromine atoms and the remainder are hydrogen atoms.

The red indirubin dyes employed in this invention are represented by formula (II). Specific examples of $R_4$, $R_5$, $R_6$, $R_4'$, $R_5'$ and $R_6'$ in the formula, either commonly or independently, include a hydrogen atom and halogen atoms, such as fluorine, chlorine and bromine atoms.

Examples of such dye are those wherein two of $R_4$, $R_5$ and $R_6$ and two of $R_4'$, $R_5'$ and $R_6'$ both are hydrogen atoms, chlorine atoms or bromine atoms and remainder are hydrogen atoms.

The blue indigoid dyes employed in this invention are represented by formula (III). Specific examples of $R_7$, $R_8$, $R_9$, $R_7'$, $R_8'$ and $R_9'$ in the formula, either commonly or independently, include a hydrogen atom and halogen atoms, such as fluorine, chlorine and bromine atoms. Preferred examples are C.T. Vat Dye 3 and 5.

The dyes of formula (I), (II) and (III) are known in the art.

Regarding the dye compositions of the present invention in which two or more kinds of dyes are contained, the combination of a yellow benzoquinone dye of formula (I) and a red indirubin dye of formula (II) can give an orange color, the combination of a yellow benzoquinone dye of formula (I) and a blue indigoid dye of formula (III) can give a green color, and colors ranging from gray to black can also be imparted by combining a yellow benzoquinone dye of formula (I), a red indirubin dye of formula (II) and a blue indigoid dye of formula (III).

In the above cases, one yellow benzoquinone dye can be mixed with one red indirubin dye or, depending on a desired color, two or more yellow benzoquinone dyes can be mixed with two or more red indirubin dyes.

In the case of a dye composition formed in combination of at least on yellow benzoquinone dye of formula (I), at least one red indirubin dye of formula (II) and at least one blue indigoid dye of formula (III), various compositions capable of imparting colors ranging from gray to black can be prepared by proportioning them at various ratios. No particular limitation is imposed on their mixing ratio, which is determined so as to give a desired gray color. The compositions include, for example, a dye composition which contains 2,5-bis(4-chloroanilino)-1,4-benzoquinone, an indirubin dye and an indigoid dye at the ratio of about 4:1:5.

The dye compositions according to this invention can be classified into two groups, one being concentrated powder products in which a powdered stock of each color material has been dry-ground and the other fine particulate products in which a powdered stock of each color material has been triturated in the presence of a dispersant.

Describing such fine particle products in further detail, they are usually provided as powdery products. For example, 100 parts of the powdered stock of each color material are triturated in the presence of about 10 to 300 parts of a solid dispersant, such as lignin or Tamol type. The dye compositions can however be supplied in various forms depending on the application purpose, for example, as powdery products, granular products, paste products or the like.

To conduct dyeing of cotton warp yarns which have been formed into a rope-like configuration, it is necessary to prepare a dye bath which contains each of the above dyes in a reduced state. Preparation of the dye bath therefrom is carried out in the following manner.

The concentration of each dye in a dye bath is determined in accordance with the color density desired for the material to be dyed. In general, a liquid stock concentrate containing 10-300 g/l is of the dye or dyes prepared and a portion of this liquid stock concentrate is diluted as needed to prepare a dye bath whose dyestuff concentration ranges from 0.5 g/l to 10 g/l.

The reduction of each dye is conducted conventionally, e.g., with a reducing agent such as hydrosulfite and an alkali agent, by way of example, whereby a solution of the dye in its reduced state is prepared. Procedures conventional in the prior art can be employed.

As one example of the alkali agent, caustic soda or a mixed alkali of caustic soda and soda ash can be added to prepare the solution of a dye of formula (I), (II) and/or (III) in the reduced state.

No particular limitation is imposed on the amount of the reducing agent which is used as long as it is sufficient to reduce the dye and maintain it in its reduced state in the dye bath during the dyeing procedure. Generally, hydrosulfite or other reducing agent is used in an amount of about 80-120 wt. % of the dye.

On the other hand, it is desirable to use the alkali agent in an amount in excess of that required to solubilize the derivative. In general, caustic soda or other alkali agent is used in an amount of about 80-120 wt. % of the dye.

A bath which contains one or more of the above dyes in its reduced state can therefore be prepared by adding the dye, a reducing agent, an alkali agent, and an optional dyeing assistant, which may be added as needed, in water in desired amounts so as to give desired concentrations and then reducing the dye at about room temperature to 70° C. for 15 minutes or so. Although no particular limitations are imposed on the temperature and time for the reduction, temperature and time around the ranges described above are suitable for the preparation of an appropriate bath which contains the dye in its reduced state.

A dye bath can then be prepared by adding a bath, which has been prepared as described above and contains one or more of the dye in its reduced state, to a portion of an aqueous solution containing predetermined amounts of caustic soda and hydrosulfite and then diluting the resultant mixture to a suitable concentration. Denim cotton warp yarns are then dyed by repeatedly immersing them in the form of a rope in the dye bath, squeezing the rope to a damp dry state and then subjecting the rope to air oxidation.

The time of immersion of the cotton warp yarns in the dye bath is short, generally from about 20 seconds to about 60 seconds. This immersion time can be determined suitably in relation to the density of the surface dyeing and properties of the material to be dyed.

After the immersion, the solution which is physically contained in the cotton warp yarns is squeezed out. It is necessary to conduct this squeezing step sufficiently to reduce the solution content of the rope in a range of 50-150% of the dry weight of the cotton yarns so that the vivid dyeing effects can be improved further by subsequent immersion and oxidation steps. The cotton warp yarns thus squeezed are oxidized in air to allow the individual dyes to develop their own colors.

The above immersion, squeezing and air oxidation steps are repeated until the resulting dyed material has the desired color density.

According to the process of this invention, a cotton rope dyed a yellow color can be obtained by using only a benzoquinone dye of formula (I). Further, a material dyed in an orange color can be obtained by using a red indirubin dye of formula (II) in combination with the benzoquinone dye of formula (I). Combined use of a blue indigoid dye of formula (III) with a benzoquinone dye of formula (I) makes it possible to obtain a material dyed in a green color. In addition, the combined use of a benzoquinone dye of formula (I), an indirubin dye of formula (II) and an indigoid dye of formula (III) provides a material dyed in a desired color hue, for example, ranging from gray to black.

In one process of this invention, a benzoquinone dye of formula (I), an indirubin dye of formula (II) and an indigoid dye of formula (III) are contained in the same dye bath. In another process of this invention, separate bath containing the respective dyes in a reduced state are prepared and dyeing is conducted sequentially in these baths.

To prepare a dye bath which contains a benzoquinone dye of formula (I), an indirubin dye of formula (II) and an indigoid dye of formula (III) together in the same dye bath, it is possible to prepare dye baths containing one of these dyes separately and then combine them. As an alternative, the dye bath can also be prepared using a dye composition which contains all of the dyes. An alkali agent, for example, caustic soda and a reducing agent, such as hydrosulfite, are then added in amounts sufficient to reduce the dye composition, followed by reduction at room temperature to 70° C. to prepare a bath in which the respective components of the dye composition are contained in their reduced state.

When dye baths separately prepared and separately containing a benzoquinone dye, an indirubin dye and an indigoid dye respectively are used, the respective dyes are used in amounts required for a desired color hue. Each of the dye baths is then added with an alkali agent, for example, caustic soda and a reducing agent, such as hydrosulfite, in amounts required to reduce the corresponding dye, followed by reduction, e.g., at room temperature to 70° C. In this manner, baths separately containing the dyes in the reduced state are prepared.

The concentrated baths which have been prepared as described above and which separately contain the respective dyes in the reduced state are suitably diluted to prepare dye baths of a suitable dyestuff concentration.

The dyeing process of the present invention, which uses the same dye bath, can be practiced typically in the following manner: A number of single conventional cotton warp yarns for blue jeans are aligned into a rope-like configuration, namely, into a tow. They are then wound into a ball-like configuration. From these thus wound warp yarns, plural yarns are paid out at the same time and are then immersed for a short time, e.g., in the order of about 20 seconds to about 60 seconds, sequentially in several sets of dye baths prepared as described above. After each immersion, the warp yarns were squeezed, followed by air oxidation. By repeating these steps, they are dyed continuously.

When dyeing is carried out using baths which separately contain a yellow benzoquinone dye, a red indirubin dye and a blue indigoid dye in their reduced state, denim cotton warp yarns are first immersed in the dye bath containing only the bath of the indigoid dye in its reduced state. After being squeezed through mangles, the moist cotton warp yarns are subjected to air oxidation. These steps are repeated several times to dye the cotton warp yarns dark blue. The cotton warp yarns are then immersed in the dye bath which contain hydrosulfite and an alkaline solution of the yellow benzoquinone dye and of the red indirubin dye. The yarns are thereafter squeezed, followed by air oxidation. These steps are repeated several times to top yellow and red colors on to the blue dyed yarns.

Such a process is repeated several times the number depending on the color hue desired or the denim cotton warp yarns.

The above process makes it possible to impart a mixed color to denim cotton warp yarns which fades and is decolored will chlorine bleach in a manner similar to blue indigo dyed denims. This process is simple and is preferred from the standpoint of workability.

The present invention will be described by the following examples, in which all designations of "part" or "parts" mean part or parts by weight and all designations of "%" are wt. %. Further, each dye is generally commercially available in the form of a finely triturated powder product which contains a solid dispersant (of the lignin or Tamol type). As the dyes in the following examples, their finely triturated products can also be used.

EXAMPLE 1

A solution (1,000 parts) which contained 50 parts of "Mitsui Indigo Pure EXN" (trade name for indigo produced by Mitsui Toatsu Dyes, Ltd.), 40 parts of solid caustic soda, 45 parts of hydrosulfite and the balance of water was heated at 70° C. for 15 minutes, whereby a solution containing indigoid dye in its reduced state was obtained. A portion (60 parts) of the solution thus prepared was added with 1 part of hydrosulfite and 0.5 part of caustic soda and water was then added to give a total amount of 1000 parts, so that an indigoid dye bath was prepared.

Denim cotton warp yarns which had been washed with warm water were immersed at room temperature for 90 seconds in the dye bath. After squeezed through mangles, the warp yarns were subjected to airing for 90 seconds. Those immersing, squeezing and airing steps were repeated 6 times.

Mixed were 48 parts of 2,5-bis(4-chloroanilino)-1,4-benzoquinone represented by formula (IV):

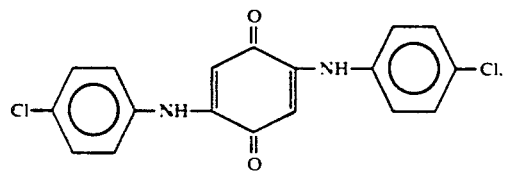

12 parts of a red indirubin represented by formula (V):

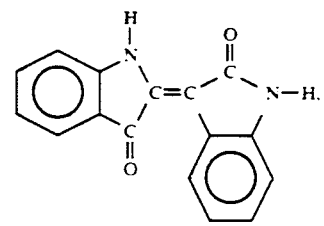

40 parts of solid caustic soda and 40 parts of hydrosulfite, followed by the addition of water to give a total amount of 1000 parts. The solution thus obtained was heated at 70° C. for 15 minutes, whereby a concentrated solution containing the dye in their reduced state was obtained. A portion (50 parts) of the solution thus prepared was added with 1 part of hydrosulfite and 0.5 part of caustic soda, followed by the addition of water to give a total amount of 1000 parts. In the dye bath thus prepared, the denim cotton warp yarns were immersed at room temperature for 30 seconds. After squeezed through mangles, the warp yarns were subjected to airing for 90 seconds. Those steps were repeated twice. The warp yarns were rinsed with water and then dried, whereby denim cotton warp yarns dyed black were obtained.

The dyed material had excellent light fastness. When immersed in a 3 g/l solution of sodium hypochlorite containing 10% of available chlorine and treated there at 40° C. for 20 minutes, the dyed material was effectively bleached into a gray color.

EXAMPLE 2

Successive dyeing was conducted under similar conditions to Example 1 except for the use of "Mitsui Tsuya Indigo RN" (trade name for C.I. Vat Blue 3 produced by Mitsui Toatsu Dyes, Ltd.) instead of "Mitsui Indigo Pure EXN". Black denim cotton warp yarns were obtained with excellent light fastness. When immersed in a 3 g/l solution of sodium hypochlorite containing 10% of available chlorine and treated there at 40° C. for 20 minutes, bleaching effect was observed so that the color hue became gray.

EXAMPLE 3

Successive dyeing was conducted under similar conditions to Example 1 except for the use of "Mitsui Tsuya Indigo 2B" (trade name for C.I. Vat Blue 5 produced by Mitsui Toatsu Dyes, Ltd.) instead of "Mitsui Indigo Pure EXN". Black denim cotton warp yarns were obtained with excellent light fastness. When immersed in a 3 g/l solution of sodium hypochlorite containing 10% of available chlorine and treated there at 40° C. for 20 minutes, bleaching effect was observed so that the color hue became gray.

EXAMPLE 4

Successive dyeing was conducted under similar conditions to Example 1 except for the use of 70 parts of "Mitsui Vat Blue HR g/f'0 (trade name for C.I. Vat Blue 3 produced by Mitsui Toatsu Dyes, Ltd.) instead of 50 parts of "Mitsui Indigo Pure EXN". Black denim cotton warp yarns were obtained with excellent light fastness. When immersed in a 3 g/l solution of sodium hypochlorite containing 10% of available chlorine and treated there at 40° C. for 20 minutes, bleaching effect was observed so that the color hue became gray.

EXAMPLE 5

Successive dyeing was conducted under similar conditions to Example 1 except for the use of 70 parts of "Mikethren Blue ACE s/f" (trade name for C.I. Vat Blue 5 produced by Mitsui Toatsu Dyes, Ltd.) instead of 50 parts of "Mitsui Indigo Pure EXN". Black denim cotton warp yarns were obtained with excellent light fastness. When immersed in a 3 g/l solution of sodium hypochlorite containing 10% of available chlorine and treated there at 40° C. for 20 minutes, bleaching effect was observed so that the color hue became gray.

EXAMPLE 6

Successive dyeing was conducted under similar conditions to Example 1 except for the use of 2,5-dianilino-1,4-benzoquinone represented by formula (VI):

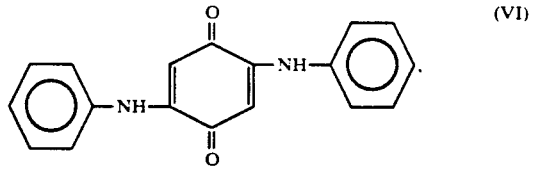

instead of 2,5-bis(4-chloroanilino)-1,4-benzoquinone represented by formula (IV). Black denim cotton warp yarns were obtained with excellent light fastness. When immersed in a 3 g/l solution of sodium hypochlorite containing 10% of available chlorine and treated there at 40° C. for 20 minutes, bleaching effect was observed so that the color hue became gray.

EXAMPLE 7

Successive dyeing was conducted under similar conditions to Example 1 except for the use of 2,5-bis(4-bromoanilino)-1,4-benzoquinone represented by formula (VII):

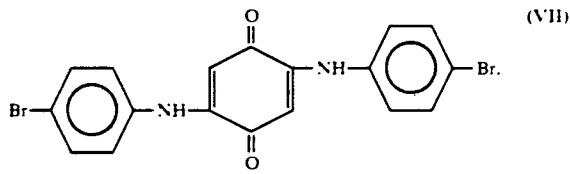

(VII)

instead of 2.5-bis(4-chloroanilino)-1,4-benzoquinone represented by formula (IV). Black denim cotton warp yarns were obtained with excellent light fastness. When immersed in a 3 g/l solution of sodium hypochlorite containing 10% of available chlorine and treated there at 40° C. for 20 minutes, bleaching effect was observed so that the color hue became gray.

EXAMPLE 8

Successive dyeing was conducted under similar conditions to Example 1 except for the use of the dibromo derivative of 2,3'-bisindole represented by formula (VIII):

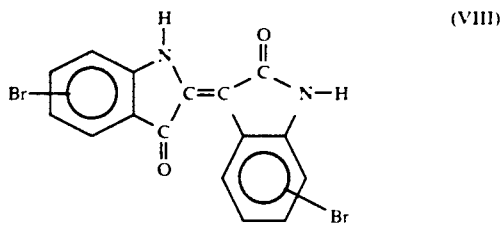

(VIII)

instead of the indirubin represented by formula (V). Black denim cotton warp yarns were obtained with excellent light fastness. When immersed in a 3 g/l solution of sodium hypochlorite containing 10% of available chlorine and treated there at 40° C. for 20 minutes, bleaching effect was observed so that the color hue became gray.

EXAMPLE 9

Successive dyeing was conducted under similar conditions to Example 1 except for the use of the tetrabromo derivative of 2,3'-bisindole represented by formula (IX):

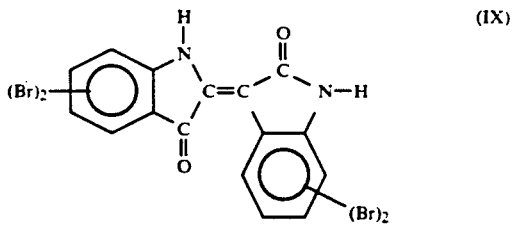

(IX)

instead of the indirubin represented by formula (V). Black denim cotton warp yarns were obtained with excellent light fastness. When immersed in a 3 g/l solution of sodium hypochlorite containing 10% of available chlorine and treated there at 40° C. for 20 minutes, bleaching effect was observed so that the color hue became gray.

EXAMPLE 10

Successive dyeing was conducted under similar conditions to Example 1 except for the use of the dichloro derivative of 2,3'-bisindole represented by formula (X):

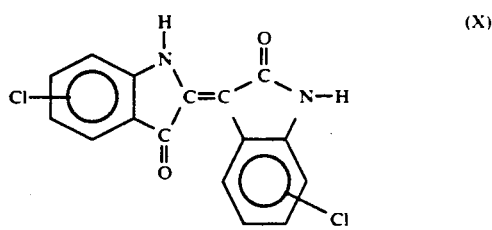

(X)

instead of the indirubin represented by formula (V). Black denim cotton warp yarns were obtained with excellent light fastness. When immersed in a 3 g/l solution of sodium hypochlorite containing 10% of available chlorine and treated there at 40° C. for 20 minutes, bleaching effect was observed so that the color hue became gray.

EXAMPLE 11

A solution (1.000 parts) which contained 9.6 parts of 2.5-bis(4-chlonoanilino)-1,4-benzoquinone represented by formula (IV), 2.4 parts of the red indirubin represented by formula (V), 12 parts of "Mitsui Indigo Pure EXN" (trade name for indigo produced by Mitsui Toatsu Dyes, Ltd.), 24 parts of solid caustic soda, 24 parts of hydrosulfite and the balance of water was heated at 70° C. for 15 minutes, whereby a concentrated solution containing dyes in their reduced state was obtained.

A portion (250 parts) of the solution thus prepared was added with 1 part of hydrosulfite and 0.5 part of caustic soda and water was then added to give a total amount of 1000 parts, so that a dye bath was prepared.

Denim cotton warp yarns which had been washed with warm water were immersed at room temperature for 30 seconds in the dye bath. After squeezed through mangles, the warp yarns were subjected to airing for 90 seconds. Those immersing, squeezing and airing steps were repeated 6 times. The warp yarns were rinsed with water and then dried, whereby denim cotton warp yarns dyed black were obtained.

The dyed material had excellent light fastness. When immersed in a 3 g/l solution of sodium hypochlorite containing 10% of available chlorine and treated there at 40° C. for 20 minutes, the dyed material was effectively bleached into a gray color.

EXAMPLES 12-22

When successive dyeing was conducted under similar conditions to Example 11 except for the use of the dyes shown in Table 1, dyed materials having color hues indicated in Table 1 were obtained. Those dyed materials had excellent light fastness. When immersed in a 3 g/l solution of sodium hypochlorite containing 10% of available chlorine and treated there at 40° C. for 20 minutes the dyed materials were effectively bleached into the color hues given in Table 1.

TABLE 1

| Ex. | Chemical structural formula | Parts | Color hue of dyed material | Color hue after bleaching |
|---|---|---|---|---|
| 12 | (phenyl-NH)-benzoquinone-(NH-phenyl) | 24 | Yellow | Light yellow |
| 13 | (4-Br-phenyl-NH)-benzoquinone-(NH-phenyl-4-Br) | 24 | Yellow | Light yellow |
| 14 | (4-Cl-phenyl-NH)-benzoquinone-(NH-phenyl-4-Cl) | 24 | Yellow | Light yellow |
| 15 | (phenyl-NH)-benzoquinone-(NH-phenyl) | 15 | Orange | Light orange |
|    | indigo-type structure | 9 | | |
| 16 | (4-Br-phenyl-NH)-benzoquinone-(NH-phenyl-4-Br) | 13 | Orange | Light orange |
|    | Br-substituted indigo-type structure | 11 | | |
| 17 | (4-Cl-phenyl-NH)-benzoquinone-(NH-phenyl-4-Cl) | 10 | Orange | Light orange |

TABLE 1-continued

| Ex | Chemical structural formula | Parts | Color hue of dyed material | Color hue after bleaching |
|---|---|---|---|---|
|  | [structure with (Br)₂ groups, indigoid] | 14 |  |  |
| 18 | [p-benzoquinone bis(phenylamino)] | 11 | Bluish green | Light bluish green |
|  | [indigo structure] | 13 |  |  |
| 19 | [p-benzoquinone bis(4-bromophenylamino)] | 15 | Green | Light green |
|  | [Br-substituted indigoid] | 8 |  |  |
| 20 | [p-benzoquinone bis(4-chlorophenylamino)] | 13 | Green | Light green |
|  | [(Br)₂-substituted indigoid] | 11 |  |  |
| 21 | [p-benzoquinone bis(phenylamino)] | 10 | Black | Gray |

TABLE 1-continued

| Ex | Chemical structural formula | Parts | Color hue of dyed material | Color hue after bleaching |
|---|---|---|---|---|
|  | [structure: dibromo isoindolinone-type with N-H, Br substituents] | 4 |  |  |
|  | [structure: symmetric dibromo bis-isoindolinone with C=C linkage] | 10 |  |  |
| 22 | [structure: 2,5-bis(4-bromoanilino)-1,4-benzoquinone] | 8 | Black | Gray |
|  | [structure: isoindolinone with (Br)$_2$ substituents] | 5 |  |  |
|  | [structure: symmetric bis-isoindolinone with (Br)$_2$ substituents on both rings] | 11 |  |  |

EXAMPLE 23

Fifth parts of "Mitsui Indigo Pure EXN" (trade name for indigo produced by Mitsui Toatsu Dyes, Ltd.) were added with 40 parts of 2,5-bis(4-chloroanilino)-1,4-benzoquinone represented by formula (IV), while 10 parts of the red indirubin represented by formula (V) were added with 5 parts of anhydrous sodium sulfate. The resultant mixtures were combined so that a mixed dye composition was prepared. A solution (1000 parts) consisting of 24 parts of the mixed dye composition, 24 parts of solid caustic soda, 24 parts of hydrosulfite and the balance of water was heated at 70° C. for 15 minutes, whereby a concentrated solution containing the dyes in their reduced state was obtained.

A portion (250 parts) of the solution thus prepared was added with 1 part of hydrosulfite and 0.5 part of caustic soda and water was then added to give a total amount of 1000 parts, so that a dye bath was prepared.

Denim cotton warp yarns which had been washed with warm water were immersed at room temperature for 30 seconds in the dye bath. After squeezed through mangles, the warp yarns were subjected to airing for 90 seconds. Those immersing, squeezing and airing steps were repeated 6 times. The warp yarns were rinsed with water and then dried, whereby denim cotton warp yarns dyed black were obtained.

The dyed material had excellent light fastness. When immersed in a 3 g/l solution of sodium hypochlorite containing 10% of available chlorine and treated there at 40° C. for 20 minutes, the dyed material was effectively bleached into a gray color.

EXAMPLES 24-30

When mixed dye compositions were prepared under similar conditions to Example 23 except for the use of the dyes shown in Table 2 and successive dyeing was conducted under similar conditions, dyed materials having the color hues indicated in Table 1 were obtained. Those dyed materials had excellent light fastness. When immersed in a 3 g/l solution of sodium hypochlorite containing 10% of available chlorine and treated there at 40° C. for 20 minutes, the dyed materials were effectively bleached into the color hues given in Table 2.

TABLE 2

| Ex | Chemical structural formula | Parts | Color hue of dyed material | Color hue after bleaching |
|---|---|---|---|---|
| 24 | (4-Cl-C6H4-NH)-substituted benzoquinone with two 4-chlorophenylamino groups | 65 | Orange | Light orange |
|  | Dibromo bis-indolinone structure (Br on each phenyl) | 35 | | |
| 25 | Bis(phenylamino)benzoquinone | 62 | Orange | Light orange |
|  | Bis-indolinone structure | 38 | | |
| 26 | Bis(phenylamino)benzoquinone | 70 | Green | Light green |
|  | Indigo-type bis-indolinone structure | 30 | | |
| 27 | Bis(4-chlorophenylamino)benzoquinone | 60 | Bluish green | Light bluish green |
|  | Dibromo indigo-type bis-indolinone structure | 40 | | |

TABLE 2-continued
| E | Chemical structural formula | Parts | Color hue of dyed material | Color hue after bleaching |
|---|---|---|---|---|
| 28 | 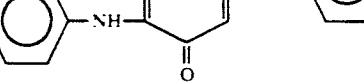 | 40 | Black | Gray |
|  | 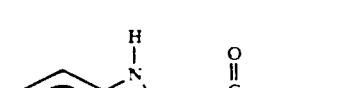 | 25 |  |  |
|  | 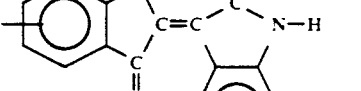 | 35 |  |  |
| 29 | 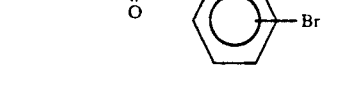 | 55 | Black | Gray |
|  | 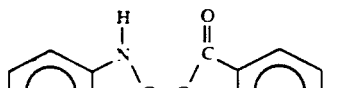 | 20 |  |  |
|  | 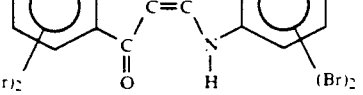 | 35 |  |  |
| 30 |  | 50 | Black | Gray |
|  | 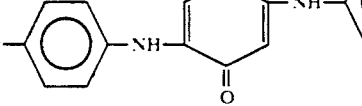 | 20 |  |  |

TABLE 2-continued

| Ex | Chemical structural formula | Parts | Color hue of dyed material | Color hue after bleaching |
|---|---|---|---|---|
| |  | 30 | | |

EXAMPLES 31–34

When successive dyeing was conducted under similar conditions to Example 1 except for the use of the dyes shown in Table 3, dyed materials having color hues indicated in Table 3 were obtained. Those dyed materials had excellent light fastness. When immersed in a 3 g/l solution of sodium hypochlorite containing 10% of available chlorine and treated there at 40° C. for 20 minutes, the dyed materials were effectively bleached into the color hues given in Table 3.

Toatsu Dyes, Ltd.), cotton warp yarns were dyed in a similar manner to Example 2.

For the sake of comparison with the cotton warp yarns obtained in the examples, the dyed state was observed and a bleach test was conducted by the following method.

Dyed State: Dyed yarns were cut by a cutter knife and their cross-sections were observed.

Bleach test: Dyed yarns were treated at 40° C. for 20 minutes in a 3 g/l solution of sodium hypochlorite containing 10% of available chlorine.

TABLE 3

| Ex | Chemical structural formula | Parts | Color hue of dyed material | Color hue after bleaching |
|---|---|---|---|---|
| 31 | CH₃—⌬—NH—quinone—NH—⌬—CH₃ | 24 | Yellow | Light yellow |
| 32 | CH₃O—⌬—NH—quinone—NH—⌬—OCH₃ | 24 | Yellow | Light yellow |
| 33 | (CH₃)₂—⌬—NH—quinone—NH—⌬—CH₃ (with CH₃) | 24 | Yellow | Light yellow |
| 34 | (CH₃)₂—⌬—NH—quinone—NH—⌬—(CH₃)₃ | 24 | Yellow | Light yellow |

COMPARATIVE EXAMPLE

Using a representative yellow vat dye, C.I. Vat Yellow 2 ("Mikethren Yellow GCN s/f", trade name; product of Mitsui Toatsu Dyes, Ltd.), a typical red vat dye, C.I. Vat Red 31 ("Mikethren Red F3B s/f", trade name; product of Mitsui Toatsu Dyes, Ltd.) and "Mitsui Indigo Pure EXN" (trade name; product of Mitsui The results are summarized in Table 4.

TABLE 4

| | Comparative Example | Example 2 |
|---|---|---|
| Dyed state | Black near fiber surface, but brown at fiber center. | Dyed in a black ring form at fiber surface. However, the |

TABLE 4-continued

| | Comparative Example | Example 2 |
|---|---|---|
| | | inside of each was not dyed and remained so-called "center white". |
| Bleach test | Black tone was bleached, leaving brown tone | After bleaching, dyed yarns became lighter as a whole and the color hue was gray. |

As is apparent from the examples and comparative example, it is understood that dyed materials of various colors, all of which have good light fastness, can be obtained by the conventional rope-dyeing technique while using at least one benzoquinone dye singly or in combination with at least one indirubin dye and/or at least one indigoid dye. The observation of the dyed states of the cotton warp yarns indicated that the fibers of the comparative example were dyed to their centers but those obtained by the dyeing process of this invention were dyed only at fiber surfaces and were not dyed inside. Cotton yarns dyed in accordance with the process of this invention can therefore show a characteristic color tone by stone washing. Further, decoloring or bleaching effect was exhibited by bleach test in the examples. It is therefore understood that cotton warp yarns dyed in accordance with the process of this invention are suited for the development of the characteristic vivid pattern of blue jeans.

What is claimed is:

1. A rope-dyeing dye composition comprising:
   a) at least one yellow benzoquinone dye represented by formula (I):

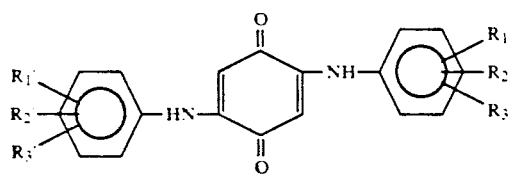

wherein $R_1$, $R_2$, $R_3$, $R_1'$, $R_2'$ and $R_3'$ each commonly or independently represent a hydrogen atom, a halogen atom, alkyl, cycloalkyl, alkenyl, aryl, aralkyl, alkoxyl or alkoxyalkyl; and further comprising one or both of b) at least one red $\Delta^{2,3'}$-biindolin-3,2'-dione dye represented by formula (II):

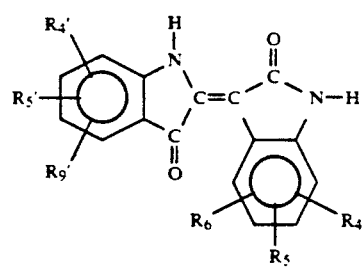

wherein $R_4$, $R_5$, $R_6$, $R_4'$, $R_5'$, and $R_6'$ each commonly or independently represent a hydrogen atom or a halogen atom; and c) at least one blue indigoid dye represented by formula (III):

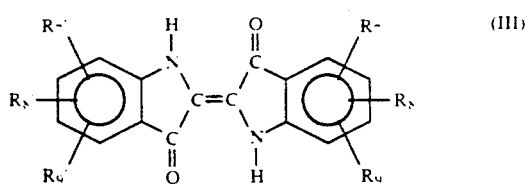

wherein $R_7$, $R_8$, $R_9$, $R_7'$, $R_8'$ and $R_9'$ each commonly or independently represent a hydrogen atom or a halogen atom.

2. A rope-dyeing dye composition of claim 1 comprising at least one red $\Delta^{2,3'}$-biindolin-3,2'-dione dye represented by formula (II).

3. A rope-dyeing dye composition of claim 1 comprising at least one blue indigoid dye represented by formula (III).

4. A rope-dyeing dye composition of claim 1 comprising both a red $\Delta^{2,3'}$-biindolin-3,2'-dione dye represented by formula (II) and a blue indigoid dye represented by formula (III).

5. A rope-dyeing dye composition of claim 1, wherein in Formula (I) one of $R_1$, $R_2$, and $R_3$ and one of $R_1'$, $R_2'$ and $R_3'$ both are a hydrogen atom, a chlorine atom or a bromine atom and the remainder are hydrogen atoms.

6. A rope-dyeing dye composition of claim 1, wherein in Formula (II) two of $R_4$, $R_5$, and $R_6$ and two of $R_4'$, $R_5'$ and $R_6'$ each are hydrogen atoms, chlorine atoms or bromine atoms and the remainder are hydrogen atoms.

7. A cotton rope dyeing bath comprising a dye composition of claim 1, an amount of alkali effective to solubilize the dyes therein and an amount of reducing agent effective to maintain the dyes therein in their reduced state.

8. A cotton rope dyeing bath of claim 7 comprising a dye of Formula (II).

9. A rope-dyeing process comprising the consecutive steps of:
   a) immersing cotton warp yarns in a rope-dyeing manner, in a dye bath containing at least one blue indigoid dye represented by formula (III):

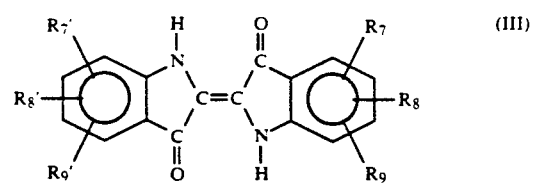

wherein $R_7$, $R_8$, $R_9$, $R_7'$, $R_8'$ and $R_9'$ each commonly or independently represent a hydrogen atom or a halogen atom, squeezing the thus-immersed cotton warp yarns, and oxidizing the thus squeezed cotton warp yarns with air;

b) repeating the immersing, squeezing and oxidizing steps of a) to thereby dye the cotton warp yarns;

c) immersing the resultant dyed cotton warp yarns in a dye bath containing a rope-dyeing dye composition comprising at least one yellow benzoquinone dye represented by formula (I):

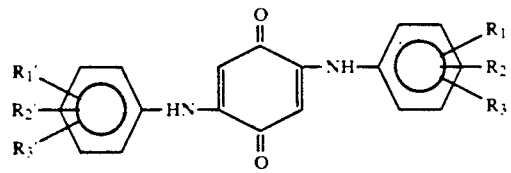

wherein $R_1$, $R_2$, $R_3$, $R_1'$, $R_2'$ and $R_3'$ each commonly or independently represent a hydrogen atom, a halogen atom, alkyl, cycloalkyl, alkenyl, aryl, aralkyl, alkoxyl or alkoxyalkyl; squeezing the thus-immersed cotton warp yarns, and oxidizing the thus-squeezed cotton warp yarns with air, and then repeating the immersing, squeezing and oxidizing steps of c) to thereby dye the cotton warp yarns.

10. A rope-dyeing process comprising immersing cotton warp yarns in a rope-dyeing manner, in a dye bath containing a rope-dyeing dye comprising at least one yellow benzoquinone dye represented by formula (I):

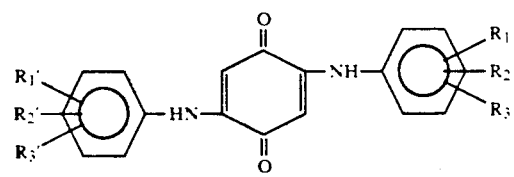

wherein $R_1$, $R_2$, $R_3$, $R_1'$, $R_2'$ and $R_3'$ each commonly or independently represent a hydrogen atom, a halogen atom, alkyl, cycloalkyl, alkenyl, aryl, aralkyl, alkoxyl or alkoxyalkyl; squeezing the thus-immersed cotton warp yarns, and oxidizing the thus-squeezed cotton warp yarns with air, and then repeating the immersing, squeezing and oxidizing steps to thereby dye the cotton warp yarns.

11. The rope-dyeing process of claim 10 wherein the dyebath further comprises at least one red $\Delta^{2,3'}$-biindolin-3,2'-dione dye represented by formula (II):

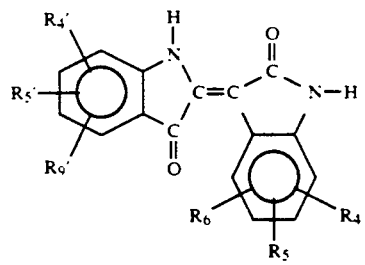

wherein $R_4$, $R_5$, $R_6$, $R_4'$, $R_5'$ and $R_6'$ each commonly or independently represent a hydrogen atom or a halogen atom.

12. The rope-dyeing process of claim 10 wherein the dyebath further comprises at least one blue indigoid dye represented by formula (III):

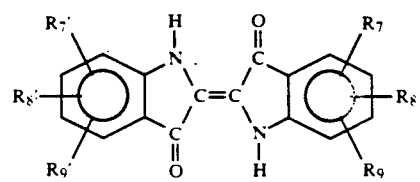

wherein $R_7$, $R_8$, $R_9$, $R_7'$, $R_8'$ and $R_9'$ each commonly or independently represent a hydrogen atom or a halogen atom.

13. The rope-dyeing process of claim 12 wherein the dyebath further comprises at least one red $\Delta^{2,3'}$-biindolin-3,2'-dione dye represented by formula (II):

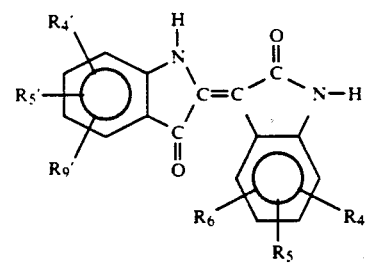

wherein $R_4$, $R_5$, $R_6$, $R_4'$, $R_5$, and $R_6'$ each commonly or independently represent a hydrogen atom or a halogen atom.

14. Denim cotton warp yarns dyed in accordance with the dyeing process of claim 9.

15. Denim cotton warp yarns dyed in accordance with the dyeing process of claim 10.

16. Denim cotton warp yarns dyed in accordance with the dyeing process of claim 11.

17. Denim cotton warp yarns dyed in accordance with the dyeing process of claim 12.

18. Denim cotton warp yarns dyed in accordance with the dyeing process of claim 13.

* * * * *